United States Patent
Lee et al.

(10) Patent No.: US 7,567,409 B2
(45) Date of Patent: Jul. 28, 2009

(54) MULTILAYER NARROW PITCH TAPE HEAD ARRAY

(75) Inventors: Edward Hin Pong Lee, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 127 days.

(21) Appl. No.: 11/046,413

(22) Filed: Jan. 28, 2005

(65) Prior Publication Data

US 2006/0050440 A1 Mar. 9, 2006

Related U.S. Application Data

(60) Provisional application No. 60/609,018, filed on Sep. 9, 2004.

(51) Int. Cl.
*G11B 5/147* (2006.01)

(52) U.S. Cl. .................................. 360/241.1; 360/121

(58) Field of Classification Search ................. 360/241, 360/241.1, 241.2, 125, 126, 121, 123
See application file for complete search history.

(56) References Cited

U.S. PATENT DOCUMENTS

| | | | |
|---|---|---|---|
| 5,452,165 A | 9/1995 | Chen et al. | |
| 5,546,650 A | 8/1996 | Dee | |
| 5,828,511 A * | 10/1998 | Bar | 360/69 |
| 5,909,346 A * | 6/1999 | Malhotra et al. | 360/126 |
| 5,982,591 A | 11/1999 | Folkerts et al. | |
| 6,236,525 B1 * | 5/2001 | Cates et al. | 360/51 |
| 6,275,350 B1 * | 8/2001 | Barndt | 360/77.12 |
| 6,650,496 B2 * | 11/2003 | Nozieres et al. | 360/63 |
| 6,687,083 B2 | 2/2004 | Hsiao et al. | |
| 7,193,812 B2 * | 3/2007 | Eaton | 360/121 |
| 7,265,940 B2 * | 9/2007 | Nagai | 360/121 |
| 7,342,748 B2 * | 3/2008 | Yip et al. | 360/241.1 |
| 2002/0060879 A1 | 5/2002 | Sato | |
| 2002/0135918 A1 * | 9/2002 | Ozue et al. | 360/55 |
| 2003/0011922 A1 * | 1/2003 | Nozieres et al. | 360/61 |
| 2003/0016474 A1 * | 1/2003 | Biskeborn | 360/319 |
| 2003/0039067 A1 | 2/2003 | Hsiao et al. | |
| 2004/0066576 A1 | 4/2004 | Lee et al. | |
| 2005/0007700 A1 * | 1/2005 | Nagai | 360/241.1 |
| 2005/0152066 A1 * | 7/2005 | Yip | 360/241.1 |
| 2005/0152067 A1 * | 7/2005 | Yip et al. | 360/241.1 |
| 2005/0201013 A1 * | 9/2005 | Ozue | 360/241.1 |
| 2006/0039082 A1 * | 2/2006 | Biskeborn et al. | 360/129 |
| 2006/0050432 A1 * | 3/2006 | Lee et al. | 360/123 |
| 2006/0050433 A1 * | 3/2006 | Lee et al. | 360/126 |

FOREIGN PATENT DOCUMENTS

| | | | |
|---|---|---|---|
| EP | 0178898 | | 4/1986 |
| JP | 01004910 A | * | 1/1989 |
| JP | 01082315 | | 3/1989 |
| JP | 0425909 | | 11/1992 |
| JP | 2003338012 A | * | 11/2003 |

* cited by examiner

*Primary Examiner*—Brian E Miller
(74) *Attorney, Agent, or Firm*—D'Arcy H. Lorimer; Lorimer Labs (57) ABSTRACT

The structure for a narrow pitch tape head array is disclosed. Narrow pitch is obtained by offsetting the location of the write gaps of successively stacked coplanar head arrays. A compact structure with lower fabrication cost is obtained by sharing magnetic pole layers between the stacked co-planar arrays.

5 Claims, 8 Drawing Sheets

MULTILAYER NARROW PITCH TAPE HEAD ARRAY

REFERENCES TO PRIOR APPLICATIONS

This application is related to provisional application, reference No. 60/609,018, filed Sep. 9, 2004, entitled MULTILAYER NARROW PITCH TAPE HEAD ARRAY and claims benefit of both thereof. Provisional application No. 60/609,018 is hereby incorporated by reference in its entirety.

BACKGROUND OF THE INVENTION

1. Field of the Invention

This invention relates to the construction of magnetic media read and write heads. More specifically, the invention relates to the construction of multi-layer tape head arrays having a narrow pitch.

2. Description of the Related Art

A typical tape head consists of an array of writers and readers dispositioned across a row fabricated by thin-film wafer technology. The separation between adjacent elements in an array has constraints. Consequently adjacent elements stretch across multiple tracks written in the tape. Read and Write access to all tracks is achieved by indexing the array across the tape.

One limitation on the separation between elements is to allow space for a wide coil on each write head. The width of the coil is constrained by magnetic requirements on the backgap size, number of turns and state-of-the-art coil photolithography. These limitation impose a separation much wider than the write track width and tape track pitch.

Figure 1:
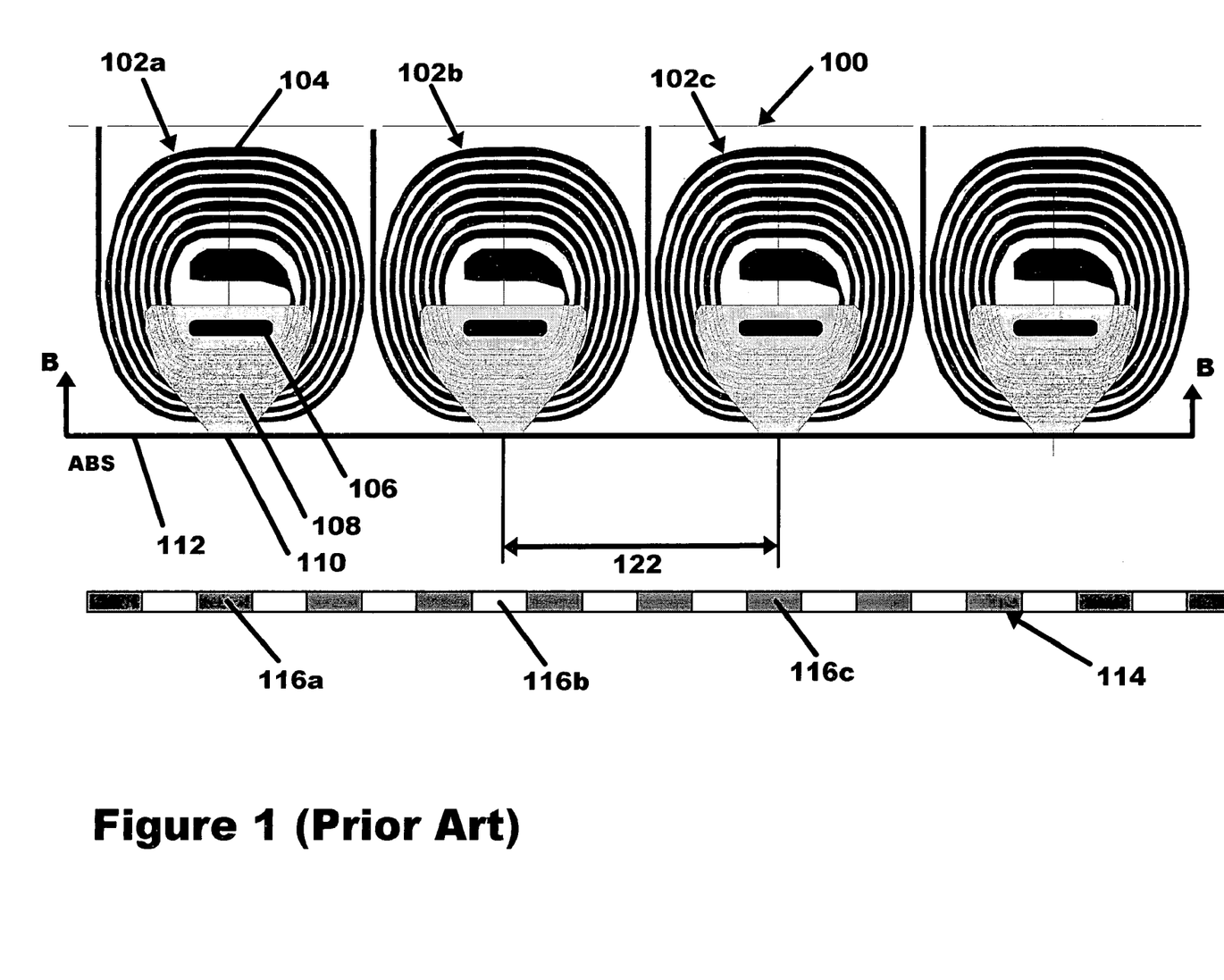
FIG. 1 (prior art) is a top view of a typical write tape head array with insulating layers transparent.

FIG. 1 is a top view of a typical write head array 100 of the prior art, with insulating layers transparent to aid in viewing relevant details. Tape or other magnetic media contacts the head array at the air bearing surface (ABS) 112. Write heads 102a-102c are located at a distance 122 from each other, which is about the width of five tracks in the example shown. Track position is determined by the center of write pole 110 of write head 102. Track location diagram 114 shows the location of tracks 116a-116c, which correspond to the write track locations of heads 102a-102c, respectively. Distance 122 is primarily determined by the width of backgap 106 in combination with the dimensions of coil 104. Yoke 108 returns the magnetic flux from write gap 110 to backgap 106.

Figure 2:
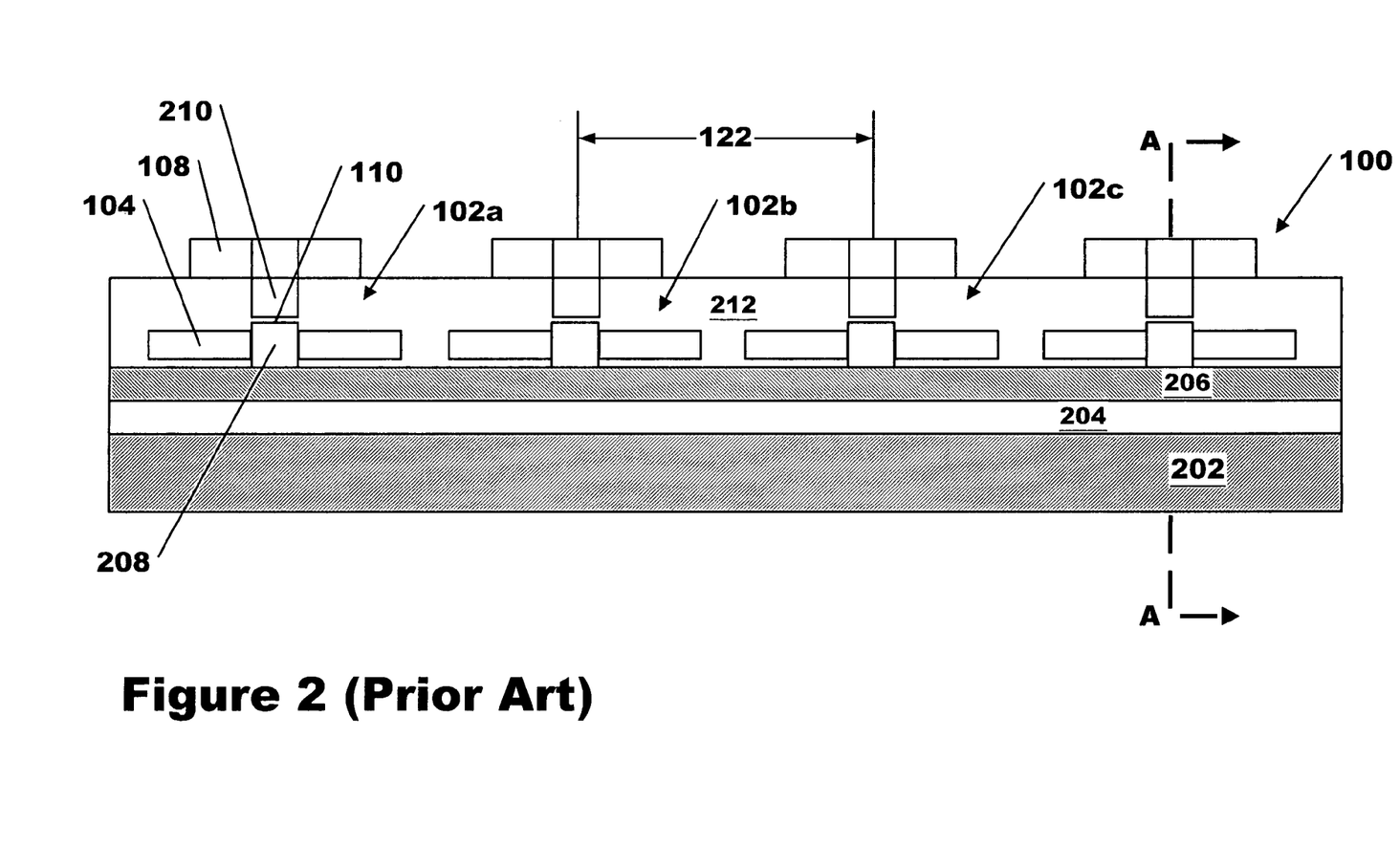
FIG. 2 (prior art) is an air bearing surface (ABS) end view at section B-B in FIG. 1 with insulating layers transparent.

FIG. 2 (prior art) is an air bearing surface (ABS) end view of tape head array 100 at section B-B in FIG. 1, with insulating layers 212 transparent to aid in viewing relevant details. Write heads 102a-102c are situated above shield layer 202 and insulating layer 204, respectively. Bottom pole layer 206 is situated above insulating layer and is common for all writes heads in the array. Bottom pole tip 208 is coupled to bottom pole layer 206. Upper pole tip 210 is separated from lower pole tip 208 by write gap 110. Upper pole tip 210 is coupled to yoke 108.

Figure 3:
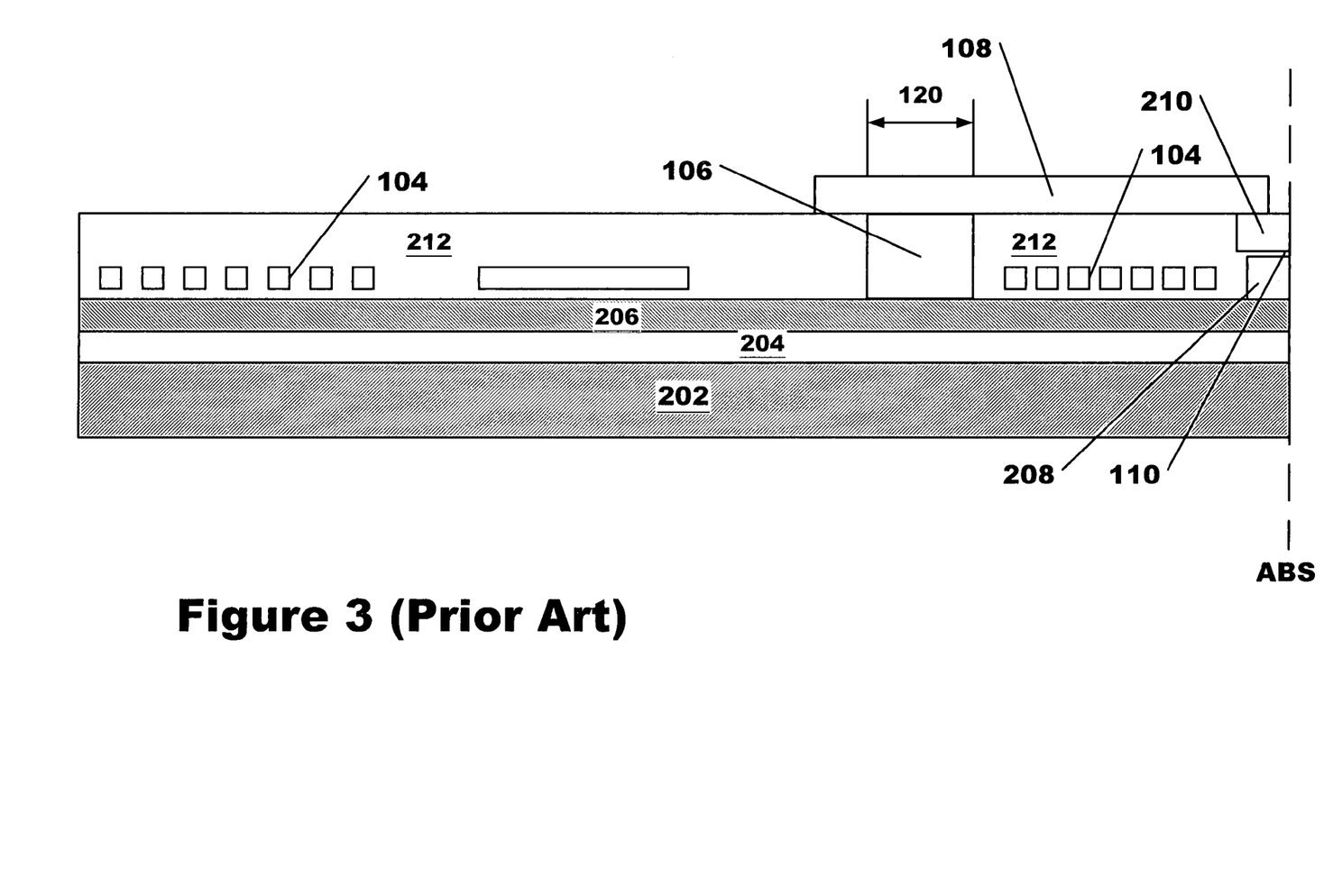
FIG. 3 (prior art) is a cross section view through section A-A of FIG. 2, with insulating layers transparent.

FIG. 3 (prior art) is a cross section view through section A-A of FIG. 2, with insulating layers transparent to aid in viewing relevant details.

U.S. Pat. No. 5,452,165 discloses a plurality of thin film magnetic heads which are arranged in a linear array with a spacing D between adjacent heads. The pole pieces of the magnetic heads are positioned in a side by side relationship in contrast to the normal pancake type of magnetic head. The linear array is angled at a skew angle theta with respect to the direction of travel of the magnetic medium. The track pitch is then D sin theta. The track width is substantially equal to the thickness of the pole tips P1T and P2T of the magnetic heads. This thickness can be in the order of 3 microns. With such a pole tip thickness the track pitch of each magnetic head in the linear array can be 3-4 microns. A plurality of narrow data tracks can then be provided with minimum pitch by a corresponding number of magnetic heads. The write signals are simultaneously fed to the heads or the read signals are simultaneously fed to the heads. This allows high data rates to be processed. The invention also provides different azimuth between adjacent heads to minimize cross talk between the tracks caused by track misregistration. Additional magnetic heads can be employed for servo control as needed.

U.S. Pat. No. 5,546,650 discloses a method of manufacturing a thin-film magnetic head having a write element capable of producing a magnetic flux density sufficient to write the high coercivity magnetic tapes at high track density. The manufacturing process requires a minimum number of lithographic steps, thereby increasing the yield of the multiple track magnetic head module. A trench is cut into the ferrite substrate material and filled with an insulator to produce a more efficient write element. A recess is then formed in the ferrite substrate having a geometry sufficient to hold a deposited thin-film conductive coil below the surface of the ferrite substrate. An insulator is then deposited on the ferrite substrate to form a gap spacer as well as to insulate the conductive thin-film coils from the ferrite substrate. The conductive thin-film coil is then deposited on the ferrite substrate in the recesses. A high-saturation flux density magnetic material is deposited on a planar nonmagnetic closure section and formed into separate magnetic pole pieces for each individual track. The magnetic pole pieces are then insulated from each other to produce a closure section having a planar surface matable with the ferrite substrate. The closure section is attached to the substrate by aligning the metal pole piece on the closure section. The magnetic pole piece is positioned in the front gap and has a width which defines the track width on the magnetic tape. The magnetic pole piece is also positioned to substantially cover the back gap region to increase the flux density existing at the front gap region.

U.S. Pat. No. 5,982,591 discloses integrated, juxtaposed head units of a magnetic head have transducing gaps directly adjacent a central plane transverse to the longitudinal direction of relative movement of a magnetic recording medium, adjacent transducing gaps being to opposite sides of the central plane. Head units adjoin each other so that a recording channel density of 100% is achieved. In one embodiment a common electrical conductor passes through a plurality of head units to one side of the central plane, and electrical connection tracks extending from a portion of the conductor form inductive transducing elements.

U.S. Pat. No. 6,650,496 discloses a matrix array of recording heads, wherein each head is independent from another both in terms of its magnetic circuit and excitation conductors. Each individual head has a planar magnetic circuit and an helical coil wrapped around the lower part of the magnetic circuit. The matrix array is collectively fabricated using full thin film technology on non-magnetic substrates. Preferably, the heads are aligned in an oblique lattice with the write gaps aligned along rows and offset by a constant value along columns. Each individual head is connected to the control electronics through interconnects to the backside of the wafer, allowing independent control of the write parameters. The die forming the device is shaped on its edges and top surface to optimize head/medium positioning and minimize wear.

U.S. Pat. No. 6,687,083 discloses a low profile inductive write head to improve track definition and head efficiency and to reduce overcoat and pole tip protrusion and cracking caused by thermal expansion. A first insulation layer of an insulation stack enclosing the coil layer is formed of an non-magnetic inorganic insulator material such as aluminum oxide,: silicon dioxide or titanium dioxide having a thickness of in the range of 0.2-0.3 microns. The thinner first insulation layer results in a significantly reduced slope of the insulation stack which decreases reflective notching during processing of the second pole tip to improve track definition. Improved thermal conduction properties of the inorganic insulator material improves heat sinking of the write coil reducing overcoat and pole tip protrusion and cracking at the pole tip/write gap layer interface.

U.S. Patent Application Publication 2002/0135918 A1 discloses a multi-magnetic recording head capable of increasing a magnetic recording density of information recorded on a magnetic recording medium. The multi-magnetic recording head includes a substrate, a pair of first thin film magnetic poles with a specific gap put therebetween, which are stacked over the substrate, and a pair of second thin film magnetic poles with a specific gap put therebetween, which are stacked over the pair of first thin film magnetic poles, wherein the pair of first thin film magnetic poles and the pair of second thin film magnetic poles are offset from each other in the direction nearly perpendicular to the stacking direction.

U.S. Patent Application Publication 2004/0066576 A1 discloses a magnetic write head having a vertically laminated back gap structure and method of making the same. The magnetic head is formed with lower and upper pole pieces and a back gap structure which connects the lower and the upper pole pieces in a back gap region. In one illustrative example, the back gap is a vertically laminated structure having alternating layers of magnetic and non-magnetic materials. Each alternating layer is perpendicular to both the lower and the upper pole pieces. This vertically laminated structure significantly reduces the eddy currents in the back gap region at high operating frequencies as the layers are oriented in a direction parallel with the magnetic flux.

U.S. Patent Application Publication 2002/0060879 A1 discloses a thin film magnetic head having a plurality of coils is capable of recording with higher density. A magnetic pole section for restricting a track width is formed between a lower core layer and an upper core layer, and two coil layers are tiered between a reference surface and a lower core layer through the intermediary of a coil insulating layer. This allows a magnetic path to be shortened. As a result, narrower tracks and lower inductance can be both achieved, and the narrower tracks combined with faster data transfer enable higher-density recording to be attained.

Head arrays of the prior art having a relatively large spacing can exhibit a number of disadvantages. One is the possibility of track misregistration (TMR), which is an alignment or registration error from the first track position (i.e. 116*a*) to the last track position (i.e. 116*c*) due to expansion or contraction of the magnetic media. Magnetic media, particularly tape, can expand or contract as a function of temperature or humidity. The magnitude of this error is dependent on the total distance between the first and last head positions in the array, therefore the further the heads are apart, the greater the registration error. Another disadvantage of a widely spaced head array is that data write times can be longer for a given media width and number of tracks. Closely spaced heads produce arrays having more heads per unit media width, and therefore more tracks can be written in parallel, increasing total data rates to the storage media. This may be of considerable importance in computer data back-up applications, where large hard drives need to be backed up on tape media.

In order to reduce adjacent head to head dimension 122, some designs in the prior art have used a staggered head positioning, requiring adjacent heads to be located on different levels (when viewed in the ABS view). This technique is advantageous in that the head spacing can be made as narrow as required without compressing coil structures or requiring state of the art lithography. This construction can result in higher production costs, however, since proportionately more layers have to be added during fabrication. This is particularly true when each head layer contains individual upper and lower pole layers. The structure is also more difficult to build due to the tendency of multiple layers to become non-planar as the stack gets thicker.

Of value would be an invention that allows a reduction of the spacing between the elements in the array while reducing the total number of layers in a staggered array. The usefulness of such an invention would be further enhanced if built with a process that incorporates planarization, so that thicker overall structures can be built with head spacings on the order of one track pitch.

SUMMARY OF THE INVENTION

It is an object of the present invention to provide a thin film head array containing a first pole layer, a third pole layer, and a second pole layer between the first and third pole layers. A first write head has a first upper pole and a first lower pole, the first upper pole including the second pole layer, the first lower pole including the first pole layer. A second write head has a second upper pole and a second lower pole, the second upper pole including the third pole layer, the second lower pole including the second pole layer.

It is another object of the present invention to provide a thin film head array containing a first pole layer, a third pole layer, and a second pole layer between said first and said third pole layers. A plurality of first write heads have a first upper pole and a first lower pole, the first upper pole including the second pole layer, the first lower pole including the first pole layer. A plurality of second write heads have a second upper pole and a second lower pole, the second upper pole including the third pole layer, the second lower pole including the second pole layer.

It is another object of the present invention to provide a method for making a thin film head array including providing a substrate having a top surface, depositing a first pole layer on the top surface of the substrate, depositing a first lower pole tip on a top surface of the first pole layer, depositing a first write gap layer on the top surface of the first lower pole tip, depositing a second pole layer on the top surface of the first write gap layer, depositing a second lower pole tip on the top surface of the second pole layer, depositing a second write gap layer on the top surface of the second lower pole tip, and depositing a third pole layer on the top surface of the second write gap layer.

It is yet another object of the present invention to provide a method for making a thin film head array including providing a substrate having the top surface, depositing a first pole layer on the top surface of the substrate, depositing a plurality of first lower pole tips on the top surface of the first pole layer, depositing a first write gap layer on top surfaces of the plurality of first lower pole tips, depositing a second pole layer on the top surface of the first write gap layer, depositing a plurality of second lower pole tips on the top surface of the second pole layer, depositing a second write gap layer on top surfaces of the plurality of second lower pole tips, and depositing a third pole layer on the top surface of the second write gap layer.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

FIGS. 1-3 (prior art) have been discussed in the Background section above.

The method of the present invention produces a compact write head structure wherein a staggered, stacked thin film head array can produce heads positioned as close as one track pitch. This can be accomplished with standard lithography techniques, as the compressed positioning need not be obtained with heads positioned within a single parallel array (side by side). The tight head to head spacing is produced by staggering multiple, stacked arrays of more widely spaced heads. See, for example, FIG. 4k. For a single layer of heads, head to head spacing 444 is much wider than 1 track pitch, and may be, for example 5 or 6 times the track pitch. However the offset 440, which is the stagger of one array relative to its immediate neighbor, can be made any convenient dimension, typically an integral number of track pitches. For the highest density, dimension 440 would be approximately one track pitch. The total number of arrays (layers of heads) needed to place heads at one track pitch would be dimension 444 divided by dimension 440 minus one. For the example of dimension 444 equal to 5 times the track pitch, and dimension 440 equal to one track pitch, 4 head layers would be required.

FIGS. 4a-k are air bearing surface end views illustrating a method of making a write head array having shared upper and lower pole layers, according to an embodiment of the present invention. The insulating layers are transparent to aid in viewing relevant details.

Figure 4A:
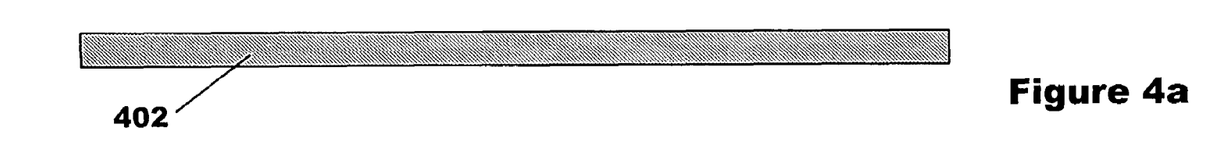
FIGS. 4a-k are air bearing surface end views illustrating a method of making a write head array having shared upper and lower pole layers, according to an embodiment of the present invention; and, FIG. 5 is a cross section view through section C-C of FIG. 4k.

In FIG. 4a, first pole layer 402 is deposited on a substrate (not shown). Layer 402 may be a continuous layer (as shown), or optionally a coplanar layer of separated segments (not shown). Layer 402 is generally composed of any suitable magnetic material, preferably one having a high magnetic moment such as Permalloy or other compositions of NiFe, CoFe or CoNiFe alloys, which may contain dopants or other additives known by those of ordinary skill in the art to provide desirable material properties. This layer may be deposited by any convenient, known method such as electroplating or vapor deposition. Subsequent to deposition, first pole layer 402 may be planarized, preferably by chemical mechanical planarization (CMP), a process well known to those skilled in the art.

Figure 4B:
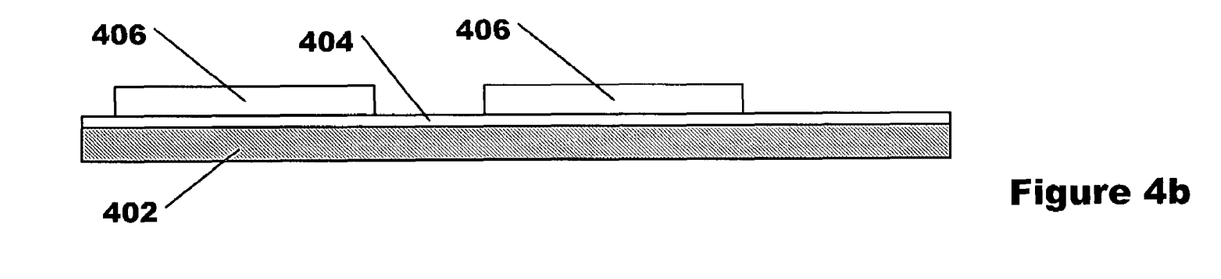

In FIG. 4b, a dielectric layer 404 is deposited upon the top surface of first pole layer 402. Layer 404 may be composed of any suitable insulating material, deposited in accordance with known methods. First coil structures 406 are then deposited upon dielectric layer 404. The intermediate steps of photo-resist deposition, imaging, development, coil electroplating, and photo-resist removal shall not be described in detail, and are well known to those skilled in the art. In accordance with the present invention, first coil structures 406 are placed at locations corresponding to each write head in the array.

Figure 4C:
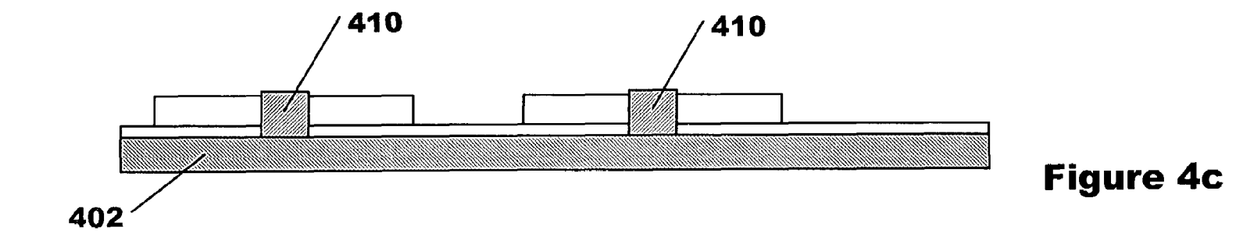

In FIG. 4c, first pole tips (also known as pedestals) 410 and first backgap array (not shown) is deposited on the first pole layer 402, after removing the appropriate regions of dielectric layer 404. First pole tips 410 coupled to first pole layer 402 comprise the lower poles of the first write head array. The material of first pole tips 410 may be composed any suitable magnetic material, preferably one having a high magnetic moment such as Permalloy or other compositions of NiFe, CoFe or CoNiFe alloys, which may contain dopants or other additives known by those of ordinary skill in the art to provide desirable material properties. This layer may be deposited by any convenient, known method such as electroplating or vapor deposition. The composition may be the same or different from that of layer 402.

Figure 4D:
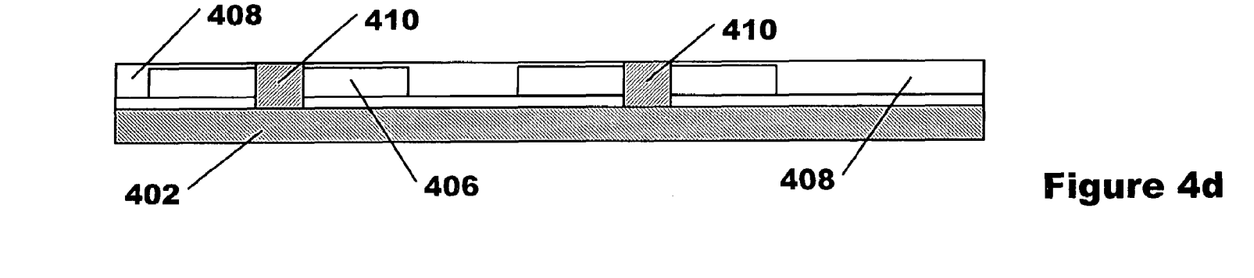

In FIG. 4d, insulating layer 408 is deposited on the structure as shown in FIG. 4c. CMP is used to planarize the structure at the top surface of first pole tips 410. Insulating layer 408 may be any suitable material, including but not limited to silica, alumina, or polymers such as polyamides and photo-resists. Preferably, alumina is used.

Figure 4E:
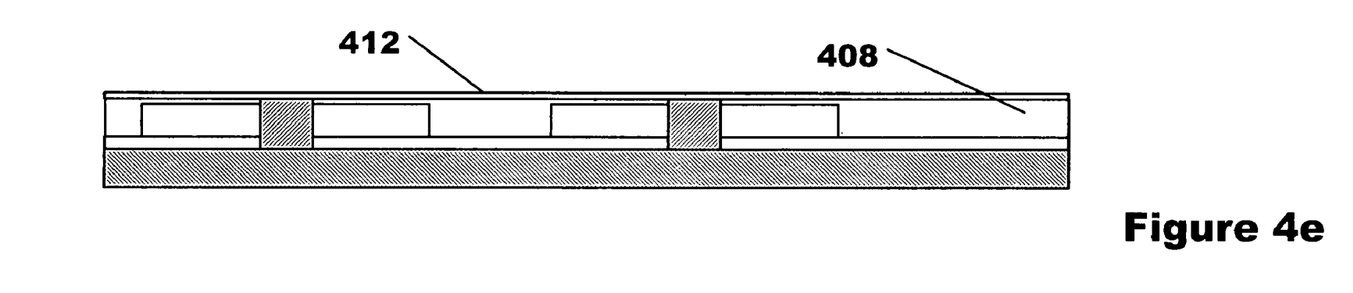

In FIG. 4e, first write gap layer 412 is deposited on the planarized insulating layer 408 and the top surface of first pole tips 410. Layer 412 is composed of any suitable non-magnetic, insulating material.

Figure 4F:
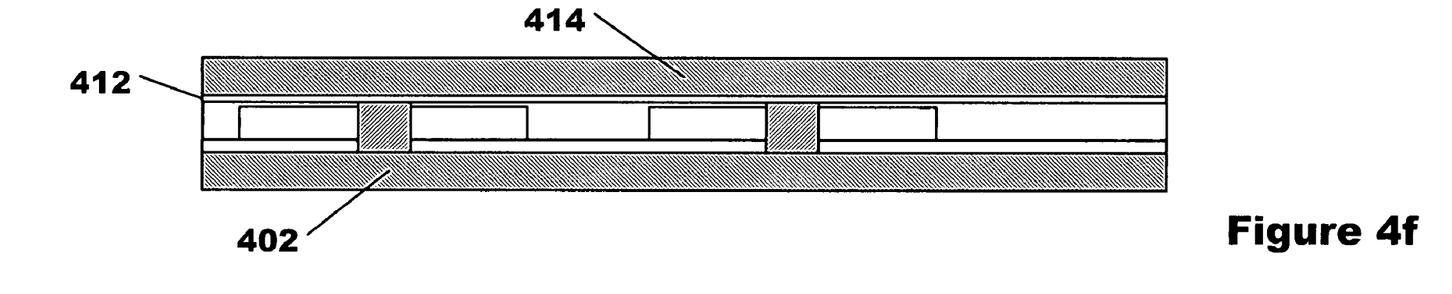

In FIG. 4f, second pole layer 414 is deposited on the first write gap layer 412. Layer 414 may be a continuous layer (as shown), or optionally a coplanar layer of separated segments (not shown). Second pole layer 414 is composed of materials as described for the first pole layer 402, and is deposited in like manner. Subsequent to deposition, the top surface of layer 412 may be planarized with CMP. In accordance with the present invention, the second pole layer 414 serves as both the upper pole for heads in the first layer, as well as a component of the lower pole for heads in the second layer. This dual functionality serves to reduce the total number of layers required to produced the stacked head array, thus reducing fabrication costs.

Figure 4G:
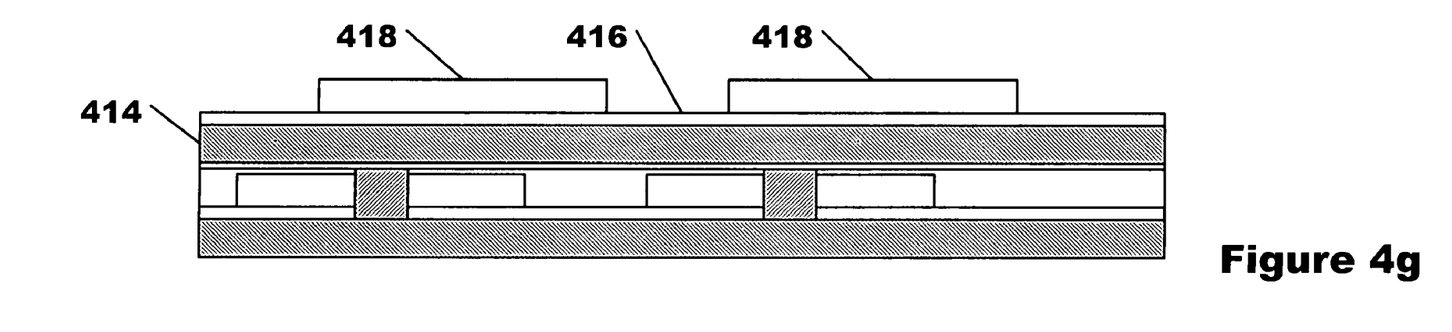

In FIG. 4g, a dielectric layer 416 is deposited upon the top surface of second pole layer 414. Layer 416 may be composed of any suitable insulating material, deposited in accordance with known methods. Second coil structures 418 are then deposited upon dielectric layer 416. In accordance with the present invention, first coil structures 418 are placed at locations corresponding to each write head in the second array, which is offset from the location of heads in the first array immediately below.

Figure 4H:
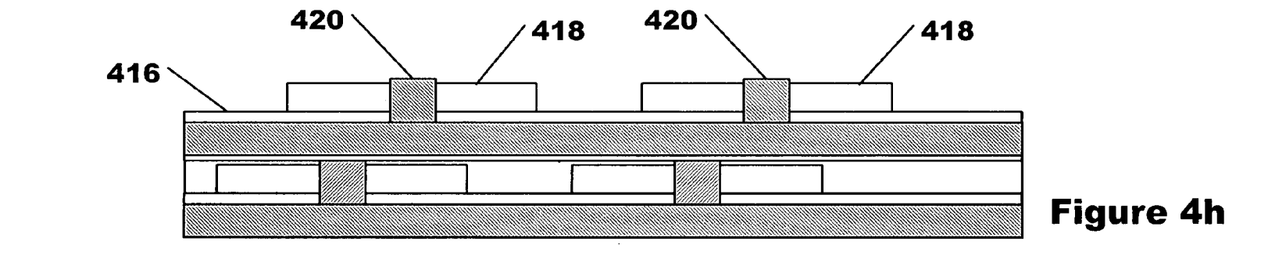

In FIG. 4h, second pole tips 420 and second backgap array (not shown) is deposited on the second pole layer 414, after removing the appropriate regions of dielectric layer 416. Second pole tips 420 coupled to second pole layer 414 comprise the lower poles of the second write head array. The material of the second pole tips 420 may be composed any suitable magnetic material, and is generally the same as used in the first pole tips 410. This layer may be deposited by any convenient, known method such as electroplating or vapor deposition.

Figure 4I:
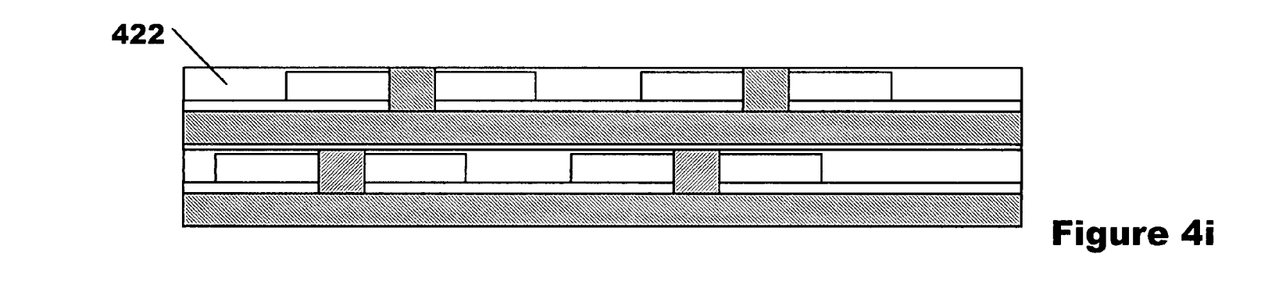

In FIG. 4i, insulating layer 422 is deposited on the structure as shown in FIG. 4c. CMP is used to planarize the structure at the top surface of second pole tips 420. Insulating layer 422 may be any suitable material, as described for layer 408.

Figure 4J:
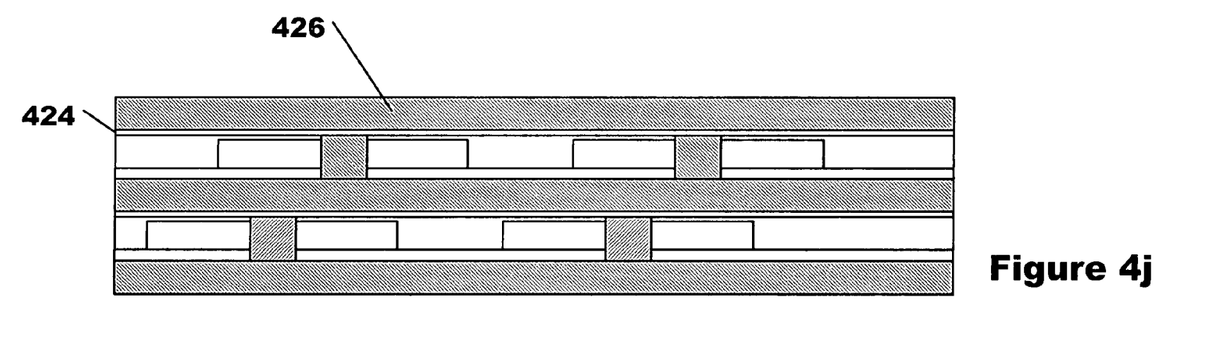

In FIG. 4j, second write gap layer 424 is deposited on the planarized insulating layer 422 and the top surface of second pole tips 420. Layer 424 is composed of any suitable non-magnetic, insulating material. Third pole layer 426 is deposited on the second write gap layer 424. Layer 426 may be a continuous layer (as shown), or optionally a coplanar layer of separated segments (not shown). Third pole layer 426 is composed of materials as described for the previous pole layers 402, 414 and is deposited in like manner. Subsequent to deposition, the top surface of layer 426 may be planarized with CMP. In accordance with the present invention, the third pole layer 426 serves as both the upper pole for heads in the second layer, as well as a component of the lower pole for heads in the third layer.

Figure 4K:
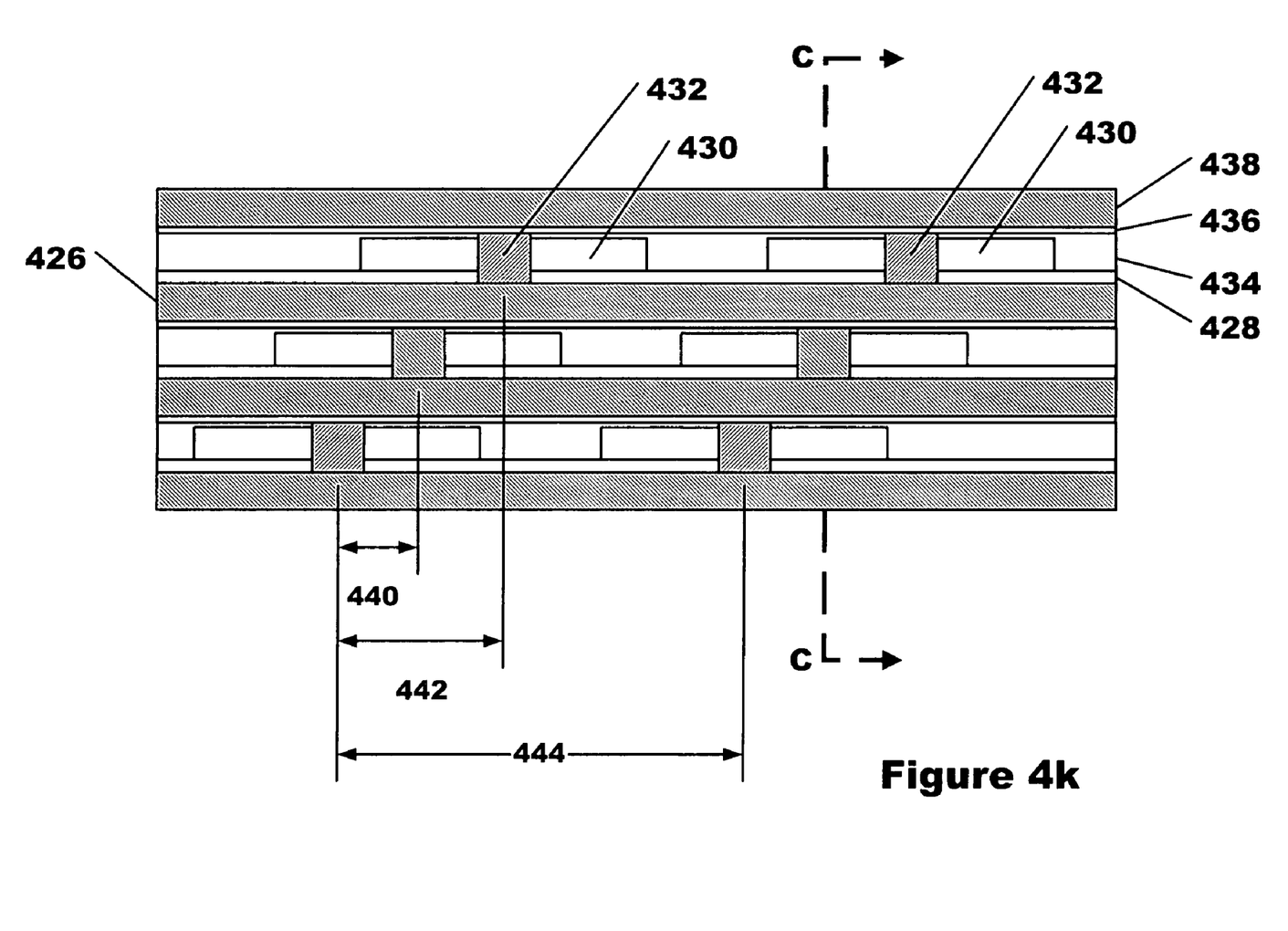

In FIG. 4k, the remaining structures for the third layer of heads are deposited. Dielectric layer 428 is deposited upon the top surface of third pole layer 426. Third coil structures 430 are then deposited upon dielectric layer 428. In accordance with the present invention, first coil structures 418 are placed at locations corresponding to each write head in the third array, which is offset from the location of heads in the second array immediately below. Third pole tips 432 and third backgap array (not shown) are deposited on the third pole layer 426, after removing the appropriate regions of dielectric layer 428. Third pole tips 432 coupled to third pole layer 426 comprise the lower poles of the third write head array. The material of the third pole tips 432 may be composed any suitable magnetic material, and is generally the same as used in pole tips 410 and 420. Subsequent to deposition of insulating layer 434, CMP is used to planarize the structure at the top surface of third pole tips 432. Insulating layer 434 may be any suitable material, as described previously. Third write gap layer 436 is deposited on the planarized insulating layer 434 and the top surface of third pole tips 432. Layer 436 is composed of any suitable non-magnetic, insulating material. Fourth pole layer 438 is deposited on the third write gap layer 436. Layer 438 may be a continuous layer (as shown), or optionally a coplanar layer of separated segments (not shown). Fourth pole layer 438 is composed of materials as described for the previous pole layers and is deposited in like manner. Subsequent to deposition, the top surface of layer 438 may be planarized with CMP if more head layers are to be built. Although a structure containing three head layers has been described in detail, it should be evident to one of ordinary skill in the art that the processes previously described may be repeated as necessary to build the desired structure. For example, if the head to head spacing within a single head layer (ref 444) is 5 times the track pitch (see FIG. 1, prior art), the offset distance 440 is one track pitch, and the offset 442 is two times the track pitch, then the total number of layers required to fully cover the media would be 4 head layers. Thus, it would be advantageous from a fabrication cost perspective to minimize the head to head spacing 444, which would reduce the number of head layers needed for single pitch coverage.

Figure 5:
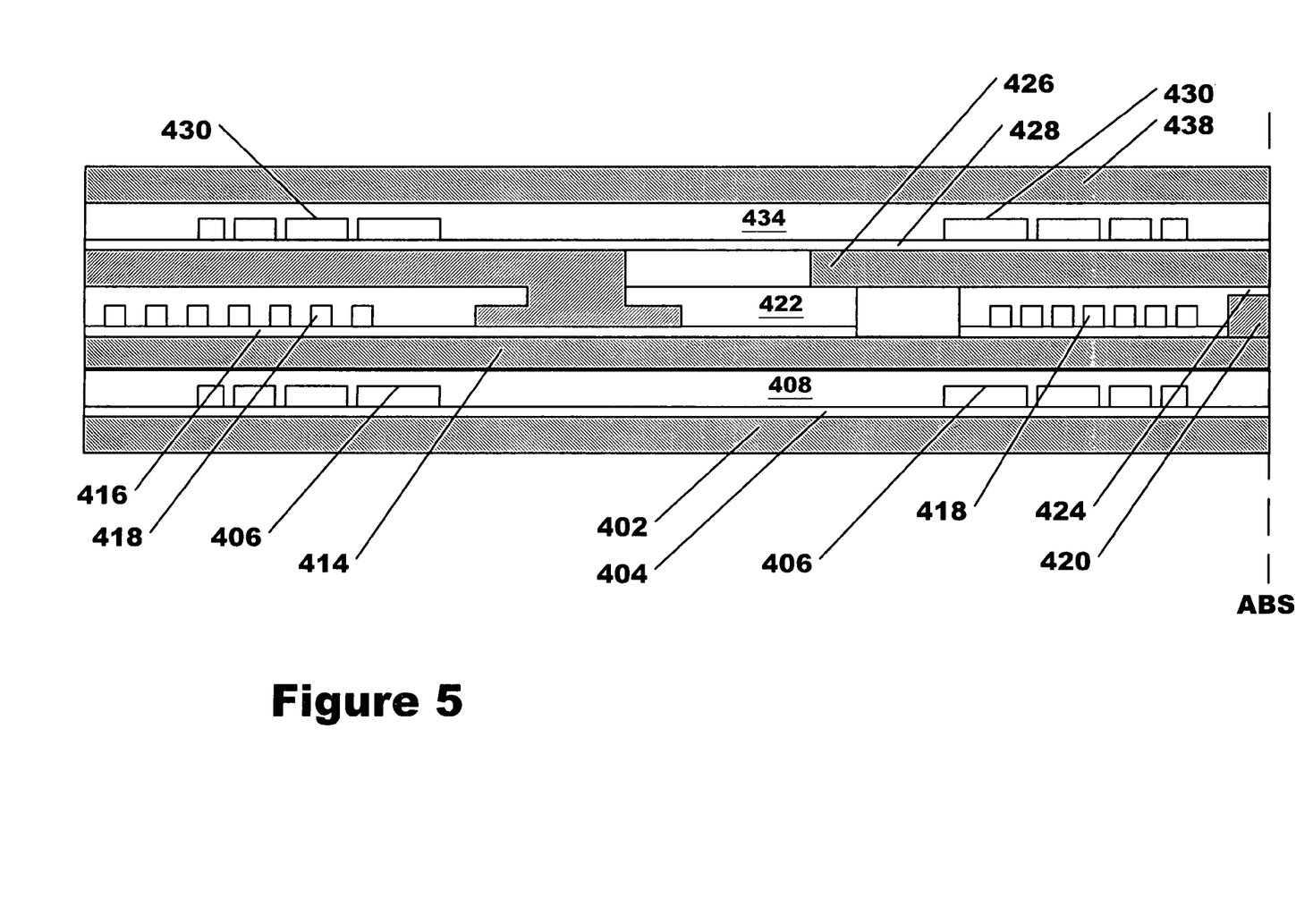

FIG. 5 is a cross section view through section C-C of FIG. 4k. Indicated structures have been previously described in FIGS. 4a-k above.

The present invention is not limited by the previous embodiments heretofore described. Rather, the scope of the present invention is to be defined by these descriptions taken together with the attached claims and their equivalents.

What is claimed is:

1. A thin film head array comprising:
a first pole layer, a second pole layer, a third pole layer, and a fourth pole layer, wherein said second pole layer resides between said first and said third pole layers, and said third pole layer resides between said second and said fourth pole layers;
a first write head having a first upper pole and a first lower pole, said first upper pole comprising said second pole layer, said first lower pole comprising said first pole layer;
a second write head having a second upper pole and a second lower pole, said second upper pole comprising said third pole layer, said second lower pole comprising said second pole layer; and,
a third write head having a third upper pole and a third lower pole, said third upper pole comprising said fourth pole layer, said third lower pole comprising said third pole layer.

2. The thin film head array as recited in claim 1 wherein
said first write head further comprises said first lower pole including said first lower pole layer magnetically coupled to a first lower pole tip, and a first write gap disposed between said first lower pole tip and said second pole layer at an air bearing surface;
said second write head further comprises said second lower pole including said second pole layer magnetically coupled to a second lower pole tip, and a second write gap disposed between said second lower pole tip and said third pole layer at said air bearing surface; and,
said third write head further comprises said third lower pole including said third pole layer magnetically coupled to a third lower pole tip, and a third write gap disposed between said third lower pole tip and said fourth pole layer at said air bearing surface.

3. A thin film head array comprising:
a first pole layer, a second pole layer, a third pole layer, and a fourth pole layer, wherein said second pole layer resides between said first and said third pole layers, and said third pole layer resides between said second and said fourth pole layers;
a plurality of first write heads having a first upper pole and a first lower pole, said first upper pole comprising said second pole layer, said first lower pole comprising said first pole layer;
a plurality of second write heads having a second upper pole and a second lower pole, said second upper pole comprising said third pole layer, said second lower pole comprising said second pole layer; and,
a plurality of third write heads having a third upper pole and a third lower pole, said third upper pole comprising said fourth pole layer, said third lower pole comprising said third pole layer.

4. The thin film head array as recited in claim 3 wherein
said plurality of first write heads further comprise
said first lower pole including said first lower pole layer magnetically coupled to a plurality of first lower pole tips, and
a plurality of first write gaps disposed between said plurality of first lower pole tips and said second pole layer at an air bearing surface;
said plurality of second write heads further comprise
said second lower pole including said second pole layer magnetically coupled to a plurality of second lower pole tips, and a plurality of second write gaps disposed between said plurality of second lower pole tips and said third pole layer at said air bearing surface; and, said plurality of third write heads further comprise said third lower pole including said third pole layer magnetically coupled to a plurality of third lower pole tips, and a plurality of third write gaps disposed between said plurality of third lower pole tips and said fourth pole layer at said air bearing surface.

5. The thin film head array as recited in claim 4 wherein said plurality of said first write gaps are approximately co-planar, said plurality of said second write gaps are approximately coplanar, and said plurality of said third write gaps are approximately coplanar.

\* \* \* \* \*